L. B. SPROUT.

Hay-Elevators.

No. 6,175. Reissued Dec. 15, 1874.

WITNESSES:

W. B. Putnam

M. B. Grew.

INVENTOR:

Lewis B. Sprout.

THE GRAPHIC CO. PHOTO-LITH. 39 & 41 PARK PLACE, N.Y.

UNITED STATES PATENT OFFICE.

LEWIS B. SPROUT, OF MUNCY, PENNSYLVANIA.

IMPROVEMENT IN HAY-ELEVATORS.

Specification forming part of Letters Patent No. 153,916, dated August 11, 1874; reissue No. 6,175, dated December 15, 1874; application filed November 23, 1874.

*To all whom it may concern:*

Figure 1:
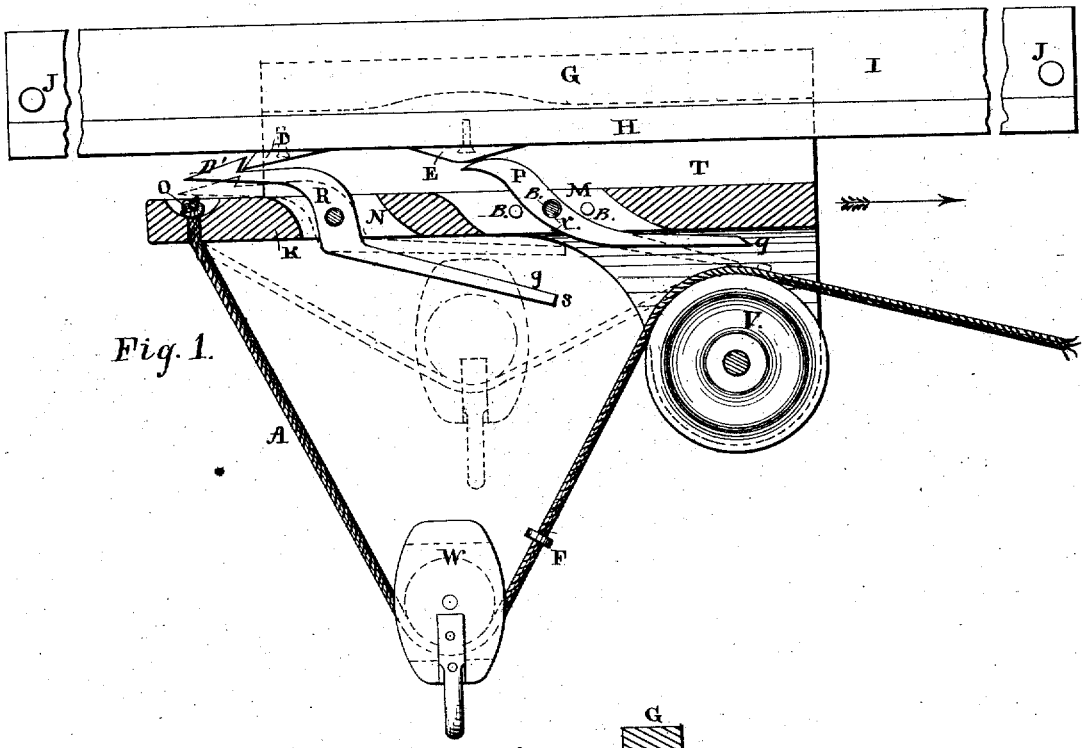
Figure 2:
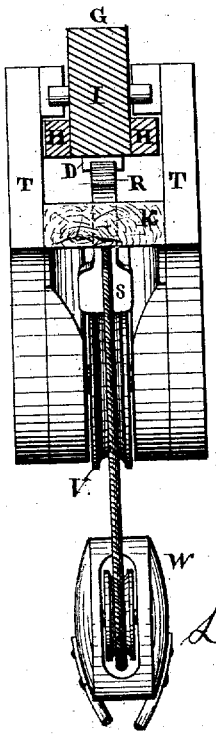

Be it known that I, LEWIS B. SPROUT, of Muncy, Lycoming county, Pennsylvania, have invented a Hay Elevator and Carrier, of which the following is a specification:

Figure 1 of the drawing represents a longitudinal vertical section of my improved elevator. Fig. 2 represents a vertical cross-section of the same.

The nature of my invention relates to a new hay elevator and carrier so constructed as to lift the hay from the load, and, after elevating it to the proper height, carry it to a point over the stack and retain it in position upon the fork until unloaded, after which the fork may be returned to its position over the load and automatically dropped upon the same, as will be hereinafter set forth.

My invention consists in a traveling-car running on a beam suspended with one end over the load of hay and the other over the stack, the said car carrying the fork attached to a block and pulley suspended by a rope or chain, one end of which is securely fastened to the car and the other passing over a pulley attached to the same, the car being provided with two levers, as will be described, one of which is designed to fasten the car to the beam while loading and elevating the hay, and to release the same automatically when the hay is properly elevated, and allow the car to travel to its place over the stack; the other, to catch and hold the rope when the car is in position over the stack, and prevent the fork from falling until unloaded, as will be fully hereinafter described.

I represents a beam suspended over the load and stack, having a track, H, attached to its lower edge, consisting of two longitudinal strips attached to the sides of the beam, as shown. K represents the car, secured to the lower edge of a yoke or frame, T, which embraces the track H upon the beam I, and slides thereon. The car K is provided with mortises M and N, in which are pivoted levers R and P. The mortise M is provided with three holes, B B B, for the purpose of shifting the lever P by inserting the movable pin X through the lever and into either of the holes, as may be desired. The end of the lever R is provided with a catch, which engages a lug, D, when the car is in position over the load. The lower end of the said lever falls below the car, as shown, for the purpose to be hereinafter specified.

The upper end of the lever P projects through the car so as to engage against a lug, E, when the car is in position over the load, the lower end *g* falling below the car, as shown, for the purpose to be hereinafter described.

The rope A is attached securely, at O, to the carriage or car, and carries a block and pulley, with a hook or bail, to which the hay-fork may be secured. The other end passes over a pulley, V, to be attached to the power.

F is a ring secured to the rope A, the object of which will be hereinafter described.

The operation of my apparatus is as follows: The carriage being in proper position over the load, as shown in Fig. 1, a charge of of hay is secured in the fork by the operator, and is elevated by drawing upon the end of the rope A passing over the pulley V. When sufficiently elevated, the pulley W lifts the lower end of the lever R, releasing the other end from the lug D, when the car will travel to the other end of the beam I. This will release the upper end of the lever P and allow the lower end to catch and hold the rope A, by means of the ring F, or by falling upon the rope at a point forward of the highest part of the pulley V, thereby locking the rope upon the pulley, thus keeping the fork suspended until unloaded.

The car may then be drawn to the forward end of the beam I by the operator, when the catch on lever R will fall over the lug D and again fasten the carriage in position, and the upper end of the lever P, coming in contact with the lug E, will release the ring F from the lower end, allowing the block W to fall by its own weight, or to be drawn down by the operator to the proper position for again charging the fork.

What I claim as my invention, and desire to secure by Letters Patent, is—

1. The combination of lever R, lugs D and E, lever P, and car K, for the purpose and in the manner herein described.

2. The combination of rope A, having ring F thereon, lever R, lugs D and E, lever P, and car K, for the purpose and in the manner herein described.

3. The combination of adjustable lever P, by means of pin X, lugs D and E, lever R, and car K, for the purpose and in the manner herein described.

4. The combination of ring F, lever R, lugs D and E, adjustable lever P, and car K, for the purpose and in the manner herein described.

LEWIS B. SPROUT.

Witnesses:
A. B. PUTNAM,
JOHN D. PETERMAN.